United States Patent Office 2,814,624
Patented Nov. 26, 1957

2,814,624

QUATERNARY AMMONIUM SALTS OF PYRIDINDOLE DERIVATIVES

Chester John Cavallito and Allan Poe Gray, Decatur, Ill., assignors to Irwin, Neisler and Company, Decatur, Ill., a corporation of Illinois No Drawing. Application February 12, 1954, Serial No. 410,047

6 Claims. (Cl. 260—293)

This invention relates to certain quaternary ammonium alkyl derivatives of pyridindole and is more particularly concerned with compounds having the following formula:

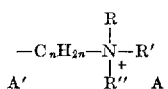

wherein n is an integer from two to twelve, inclusive, R and R' are lower-alkyl radicals which may be the same, different, or joined together to form a saturated or unsaturated heterocyclic ring, wherein R'' is lower-alkyl or aralkyl, and wherein the unsatisfied valence is attached to the pyridine nitrogen of a pyridindole derivative selected from the group consisting of 9-pyrid-2,3b-indole, 9-pyrid-3,4b-indole, 9-pyrid-1,2,3,4-tetrahydro-2,4b-indole, and lower-alkyl substituted derivatives of these radicals and wherein A and A' are anions at least one of which is halogen.

The compounds of the present invention are crystalline solids, having relatively high melting points and are soluble in water. Preliminary pharmacological testing has indicated that these compounds have utility as hypotensive agents.

Preparation of the compounds of the present invention may be readily accomplished by providing a suitable haloalkyl quaternary ammonium halide having the formula:

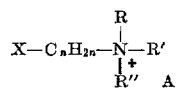

wherein n, R, R', R'' and A have the previously assigned values, and wherein X is a halogen selected from the group consisting of chlorine, bromine or iodine. This starting material is reacted with an appropriate pyridindole material, in a suitable solvent. Representative solvents which are suitable include, for example, acetonitrile, alcohol such as ethyl alcohol, isopropyl alcohol, propyl alcohol, isoamyl alcohol, et cetera, mixtures of dioxane and a suitable alcohol, and similar polar solvents and solvent mixtures. Appropriate pyridindole materials which are suitable include, for example, harman, norharman, Py-N-methyl-tetrahydroharman, alpha-carboline, 1-ethyl-9-pyrid-3,4b-indole, Py-N-hexyltetrahydroharman, 1-pentyl-9-pyrid-3,4b-indole, 1,9-dimethyl-9-pyrid-3,4b-indole, et cetera. Reaction is usually conducted at a temperature from about room temperature to about 150 degrees centigrade, however, other temperatures may be employed. About eighty degrees centigrade is preferred. Proportions of the reactants used are dependent upon ease of separation and availability of the starting materials, generally approximately equivalent proportions of the reactants are conveniently used. After heating the mixture, the compounds of the present invention will begin to settle out and precipitate from the reaction mixture. In the event no precipitation occurs, ether may be added to the reaction mixture to cause precipitation in a conventional manner. Separation and purification may be accomplished in conventional manner.

Representative haloalkyl quaternary ammonium salts which are suitable in the process of the present invention include those materials which have been described and claimed in a copending application of C. J. Cavallito and A. P. Gray, Serial 406,052, filed January 25, 1954, and include, for example, 3-bromopropyldiethylmethylammonium bromide, 3-bromopropyltrimethylammonium bromide, 6-bromohexyltrimethylammonium bromide, 5-bromopentyltrimethylammonium bromide, 2-chloroethyltrimethylammonium bromide, 10-bromodecyltrimethylammonium bromide, 3-bromopropyl-N-methylpiperidinium bromide, 3-bromopropyl-N-methylpyrrolidinium bromide, 3-bromopropylbenzyldimethylammonium bromide 7-chloroheptyl-N-propylmorpholinium chloride, 10-iododecyltrimethylammonium iodide, 8-iodooctyl-N-benzylpiperidinium iodide, 3-bromopropylpyridinium-chloride, et cetera, that is, a material comprising an alkane hydrocarbon chain having between two and twelve carbon atoms, and substituted both by a halogen and omega to the halogen by a suitable quaternary ammonium group containing lower-alkyl or aralkyl groups on the nitrogen atom.

The following examples illustrate certain procedures whereby some of the compounds of the present invention may be prepared, but are not to be construed as limiting.

Example 1

A solution of 12.0 grams (0.037 mole) of crude (ninety percent pure) 3-bromopropyldiethylmethylammonium bromide and 3.6 grams (0.02 mole) of harman in 75 milliliters of acetonitrile was refluxed on the steam bath. A precipitate began to form after about two hours. After approximately fifteen hours, the hot reaction mixture was filtered and the precipitate recrystallized from absolute ethanol. A yield of 6.4 grams (69 percent of the theoretical yield) of 1-(1-methyl-9-pyrid-3,4b-indolium)-3-(diethylmethylammonium) propane dibromide, melting at 252–254 degrees centigrade with decomposition, was obtained.

Analysis.—Calculated: C, 50.97; H, 6.20; Br, 33.92. Found: C, 51.51; H, 6.22; Br, 33.56.

This material has the following structural formula:

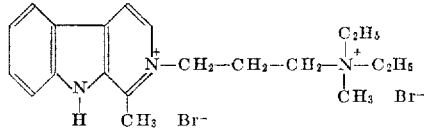

Example 2

A solution of 4.0 grams (0.02 mole) of Py-N-methyltetrahydroharman and 7.83 grams (0.03 mole) of crude 3-bromopropyltrimethylammonium bromide in 25 milliliters of absolute ethanol was refluxed for twenty hours. Dilution with anhydrous ether precipitated 12.3 grams of oily solid which was reprecipitated from ethanol with ether and then from n-propyl alcohol with ethyl acetate. 1-(1,2-dimethyl-1,2,3,4-tetrahydro-9-pyrid-3,4b-indolium)-3-(trimethylammonium) propane dibromide was obtained as a hygroscopic solid.

Example 3

A solution of 3.4 grams (0.02 mole) of alpha-carboline and 10.4 grams (0.04 mole) of 3-bromopropyltrimethylammonium bromide in a mixture of forty milliliters of dioxane and forty milliliters of isopropyl alcohol was refluxed in an oil bath for a total of fifty hours. The cooled solution was diluted with ether and the solid precipitate recrystallized from ethanol and ethyl acetate. There was thus obtained 7.4 grams (86 percent of the theoretical yield) of 1-(9-pyrid-2,3b-indolium)-3-(trimethylammonium)-propane dibromide, melting with decomposition, at 180 degrees centigrade.

*Analysis.*—Calculated: Br, 37.24. Found: Br, 37.05.

The following table comprises data obtained for compounds prepared by the methods of the foregoing examples:

| No. | Name | Corrected M. P., °C. | Analyses Calc'd | Analyses Found |
|---|---|---|---|---|
| 4 | 1-(1-methyl-9-pyrid-3,4b-indolium)-3-(trimethyl-ammonium) propane dibromide | 271–274 (decomp.) | C, 48.77<br>H, 5.70<br>Br, 36.06 | C, 49.04.<br>H, 5.76.<br>Br, 35.86. |
| 5 | 1-(1-methyl-9-pyrid-3,4b-indolium)-5-(trimethyl-ammonium) pentane dibromide | 283–285 (decomp.) | C, 50.96<br>H, 6.21<br>Br, 33.91 | C, 50.64.<br>H, 6.44.<br>Br, 33.87. |
| 6 | 1-(1-methyl-9-pyrid-3,4b-indolium)-6-(trimethylammonium) hexane dibromide | 264–265 (decomp.) | C, 51.96<br>H, 6.45<br>Br, 32.93 | C, 51.56.<br>H, 6.83.<br>Br, 32.22. |
| 7 | 1-(1-methyl-9-pyrid-3,4b-indolium)-10-(trimethylammonium) decane dibromide | Gas evol. 162–164 | C, 55.45<br>H, 7.27<br>Br, 29.52 | C, 55.26.<br>H, 7.63.<br>Br, 28.75. |
| 8 | 1-(1-methyl-9-pyrid-3,4b-indolium)-3-(triethylammonium) propane dibromide | 250–252 (decomp.) | C, 51.96<br>H, 6.45<br>Br, 32.93 | C, 52.25.<br>H, 6.39.<br>Br, 33.03. |
| 9 | 1-(1-methyl-9-pyrid-3,4b-indolium)-3-(N-methylpyrrolidinium) propane dibromide | 199 (decomp.) | C, 51.18<br>H, 5.81<br>Br, 34.06 | C, 51.09.<br>H, 6.06.<br>Br, 33.46. |
| 10 | 1-(1-methyl-9-pyrid-3,4b-indolium)-3-(benzyldimethylammonium) propane dibromide | 246–248 | C, 55.50<br>H, 5.64<br>Br, 30.78 | C, 55.20.<br>H, 5.70.<br>Br, 29.83. |
| 11 | 1-(1-methyl-9-pyrid-3,4b-indolium)-3-(N-methylpiperidinium) propane dibromide | 274–275 | C, 52.18<br>H, 6.06<br>Br, 33.07 | C, 51.88.<br>H, 6.15.<br>Br, 33.28. |
| 12 | 1-(1,9-dimethyl-9-pyrid-3,4b-indolium)-3-(trimethylammonium) propane dibromide | Gas evol. above 254 | C, 49.94<br>H, 5.93<br>Br, 34.95 | C, 49.89.<br>H, 6.04.<br>Br, 34.95. |
| 13 | 1-(9-pyrid-3,4b-indolium)-3-(trimethylammonium) propane dibromide | 287 (decomp.) | C, 47.57<br>H, 5.41<br>Br, 37.24 | C, 47.63.<br>H, 5.35.<br>Br, 36.69. |

Various modifications may be made in the present invention without departing from the spirit or scope thereof, and it is to be undersood that we limit ourselves only as defined in the appended claims.

We claim:

1. A compound having the formula:

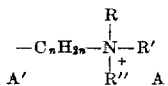

wherein $n$ is an integer from two to twelve, inclusive, R and R' are lower-alkyl radicals which may be joined together to form a heterocyclic radical selected from the group consisting of pyrrolidyl, piperidyl, morpholyl, and pyridyl, wherein R'' is selected from the group consisting of lower-alkyl therefor aralkyl, and wherein the unsatisfied valence is attached to the pyridine nitrogen of a pyridindole selected from the group consisting of 9-pyrid-2,3b-indole, 9-pyrid-3,4b-indole, 9 - pyrid-1,2,3,4-tetrahydro-3,4b-indole, and lower-alkyl substituted derivatives of these heterocyclic bases and wherein A and A' are stable, non-toxic anions, at least one of which is a halogen selected from the group consisting of chlorine, bromine, and iodine.

2. 1-(1,2-dimethyl-1,2,3,4-tetrahydro-9-pyrid-3,4b-indolium)-3-(trimethylammonium)propane dibromide.

3. 1-(1-methyl-9-pyrid-3,4b-indolium)-3-(trimethylammonium)propane dibromide.

4. 1-(1-methyl-9-pyrid-3,4b-indolium)-3-(N-methylpyrrolidinium)propane dibromide.

5. 1-(1,9 - dimethyl-9-pyrid-3,4b-indolium)-3-(trimethylammonium)propane dibromide.

6. 1-(9-pyrid-3,4b-indolium)-3-(trimethylammonium)-propane dibromide.

References Cited in the file of this patent

UNITED STATES PATENTS

| 2,642,438 | Duschinsky | June 16, 1953 |
| 2,688,022 | Burtner | Aug. 31, 1954 |

OTHER REFERENCES

Simons Industrial and Engineering Chemistry, vol. 39, p. 238, 1947.

UNITED STATES PATENT OFFICE

CERTIFICATE OF CORRECTION

Patent No. 2,814,624                                         November 26, 1957

Chester John Cavallito et al.

It is hereby certified that error appears in the printed specification of the above numbered patent requiring correction and that the said Letters Patent should read as corrected below.

Column 1, line 30, for "-tetrahydro-2,4b-" read -- -tetrahydro-3,4b- --; column 3, line 50, for "lower-alkyl therefor aralkyl," read -- lower-alkyl and aralkyl, --.

Signed and sealed this 25th day of February 1958.

(SEAL)
Attest:
KARL H. AXLINE
Attesting Officer

ROBERT C. WATSON
Commissioner of Patents